US012780152B2

(12) United States Patent
Wu et al.

(10) Patent No.: US 12,780,152 B2
(45) Date of Patent: Nov. 3, 2026

(54) WIPER ARM NOZZLE, WIPER AND AUTOMOBILE

(71) Applicant: Guangzhou NV Automotive Parts Co., Ltd., Guangzhou (CN)

(72) Inventors: Yuzhao Wu, Guangzhou (CN); Zhenyu Zhong, Guangzhou (CN); Cao Mo, Guangzhou (CN); Dapeng Zhao, Guangzhou (CN)

(73) Assignee: Guangzhou NV Automotive Parts Co., Ltd., Guangzhou (CN)

( * ) Notice: Subject to any disclaimer, the term of this patent is extended or adjusted under 35 U.S.C. 154(b) by 227 days.

(21) Appl. No.: 18/938,414

(22) Filed: Nov. 6, 2024

(65) Prior Publication Data

US 2025/0065847 A1 Feb. 27, 2025

Related U.S. Application Data

(63) Continuation of application No. PCT/CN2023/104954, filed on Jun. 30, 2023.

(30) Foreign Application Priority Data

Oct. 13, 2022 (CN) ........................ 202211254489.6

(51) Int. Cl.
*B60S 1/52* (2006.01)

(52) U.S. Cl.
CPC .................................... *B60S 1/522* (2013.01)

(58) Field of Classification Search
CPC ............ B60S 1/522; B60S 1/52; B60S 1/524
See application file for complete search history.

(56) References Cited

U.S. PATENT DOCUMENTS

| | | | | |
|---|---|---|---|---|
| 6,393,652 B1 * | 5/2002 | Vogt | ........................ | B60S 1/522 15/250.04 |
| 2007/0257133 A1 | 11/2007 | Bettenhausen et al. | | |

FOREIGN PATENT DOCUMENTS

| | | |
|---|---|---|
| CN | 106573581 A | 4/2017 |
| CN | 211731326 U | 10/2020 |

(Continued)

OTHER PUBLICATIONS

International Search Report received in International Patent Application No. PCT/CN2023/104954, mailed Sep. 28, 2023, 13 pages.

(Continued)

*Primary Examiner* — Andrew A Horton
(74) *Attorney, Agent, or Firm* — Cooper Legal Group, LLC

(57) ABSTRACT

The present application discloses a wiper arm nozzle, a wiper and an automobile. The wiper arm nozzle includes a nozzle body and a mounting portion, wherein an interior of the mounting portion is hollow and a bottom of the mounting portion communicates with a water inlet of the nozzle body, and either end of the mounting portion is provided to be open; a deflector inserted into the mounting portion, wherein a first runner and a second runner are defined on the deflector, the first runner forms a first water outlet at one end of the mounting portion, and the second runner forms a second water outlet at the other end of the mounting portion; wherein the first runner and the second runner are connected with a self-excited runner, and the first runner and the second runner gradually widen in a direction adjacent to the water outlet.

10 Claims, 5 Drawing Sheets

(56) References Cited

FOREIGN PATENT DOCUMENTS

| | | | |
|---|---|---|---|
| CN | 114734957 | A | 7/2022 |
| CN | 115743036 | A | 3/2023 |
| DE | 19646972 | A1 | 5/1998 |
| JP | 2004203180 | A | 7/2004 |
| JP | 2007112383 | A | 5/2007 |
| JP | 2013001246 | A | 1/2013 |
| JP | 3204710 | U | 6/2016 |
| JP | 2017520443 | A | 7/2017 |
| JP | 2019151222 | A | 9/2019 |

OTHER PUBLICATIONS

First Office Action received in corresponding Japanese patent application No. 2025-511986, dated Nov. 25, 2025, 7 pages.
Notice of Allowance received in corresponding Japanese patent application No. 2025-511986, dated Feb. 4, 2026, 6 pages.

* cited by examiner

WIPER ARM NOZZLE, WIPER AND AUTOMOBILE

CROSS-REFERENCE TO RELATED APPLICATION

The present application is a continuation of PCT application serial No. PCT/CN2023/104954, filed on Jun. 30, 2023, which claims the priority benefits of China patent application No. 202211254489.6, filed on Oct. 13, 2022. The entireties of PCT application serial No. PCT/CN2023/104954 and China patent application No. 202211254489.6 are hereby incorporated by reference herein and made a part of this specification.

TECHNICAL FIELD

The present application relates to the technical field of automobile accessories, in particular to a wiper arm nozzle, a wiper and an automobile.

BACKGROUND ART

More and more automobiles in the market are each equipped with a wiper arm nozzle. As the wiper arm nozzle will not be affected by wind pressure during operation of the automobile, and will not consume excess water, the water is basically all sprayed into a scraping area, which can better achieve a cleaning and wetting effect, and the cleaning effect is better, providing drivers with a better experience in vision and use.

However, as the wiper arm nozzle on the market now requires particularly small dimensions and requires space to wrap a ball, the ball can only be made very small. A spray shape of water is a point shape, and the water is shaped as a water column when spayed on a glass. The water column-shaped water flow covers a small area and has many blank areas, so the wiper would likely to dry scrape and damage the glass. A point-spraying wiper arm nozzle is relatively thick, which not only reduces a utilization rate of washing liquid, but also more easily shields the driver's sight.

SUMMARY

An object of the present application is to provide a wiper arm nozzle to solve defects in the prior art that the point-spraying wiper arm nozzle has a small spraying area and many blank areas, which lead to the wiper would likely to dry scrape and damage the glass.

In order to achieve the above object, a first aspect of the present application provides a wiper arm nozzle including:

a nozzle body provided with a water inlet;

a mounting portion provided on the nozzle body, wherein an interior of the mounting portion being hollow forms a mounting cavity, a bottom of the mounting cavity communicates with the water inlet, and two ends of the mounting portion are respectively defined with a first opening and a second opening; and a deflector inserted into the mounting cavity and partially located at the first opening and the second opening, wherein a first runner and a second runner are defined on the deflector, the first runner forms a first water outlet at the first opening, and the second runner forms a second water outlet at the second opening;

wherein the first runner and the second runner are connected with a self-excited runner, the first runner gradually widens in a direction adjacent to the first water outlet, and the second runner gradually widens in a direction adjacent to the second water outlet.

The wiper arm nozzle is provided with the first water outlet and the second water outlet, and both water outlets are provided to be widened in the direction adjacent to the water outlets, and the first runner and the second runner are connected with the self-excited runner, so that a water sprayed from two of the water outlets is in a fan shape swinging left and right, and particles of the water are evenly distributed in an S-shape in a fan section area. As such, a water flow is sprayed more uniformly, a coverage area is large, and the blank area is small.

In some embodiments, the self-excited runner includes a shunt portion provided on the deflector, two shunt blocks facing each other are provided inside the shunt portion, a first deflecting portion is formed between the two shunt blocks and an inner wall of the shunt portion, and a second deflecting portion is formed between the two shunt blocks, wherein the second deflecting portion gradually widens in the direction adjacent to the first water outlet or the second water outlet.

In some embodiments, when the deflector is inserted into the mounting cavity, portions of the deflector on either side of the first runner and the second runner are fitted to an inner wall of the mounting portion to form a first water outlet channel and a second water outlet channel, wherein a flow direction of the first runner is opposite to that of the second runner.

In some embodiments, the first runner and the second runner are on the same side of the deflector; or the first runner and the second runner are on either side of the deflector.

In some embodiments, a limiting block is provided on the mounting portion and is located below the second opening, and when the deflector is inserted into the mounting cavity, the limiting block abuts against the deflector.

In some embodiments, the first opening is larger than the second opening, and the first opening forms an insertion end of the mounting portion.

In some embodiments, the limiting block is concave to form a snap-fit portion, an extension section is provided on the deflector, and the extension section can be inserted into the snap-fit portion.

In some embodiments, the mounting portion is integrally connected to the nozzle body.

A second aspect of the present application provides a wiper including:

a wiper arm; and the wiper arm nozzle of any one of the above embodiments, wherein the wiper arm nozzle is provided on the wiper arm, and the first water outlet and the second water outlet respectively face two opposite directions of the wiper arm.

The wiper arm nozzle of the wiper sprays from two directions, the coverage area is large, which is convenient for the wiper arm to wipe. Due to a large coverage area and uniform spraying of the wiper arm nozzle, the wiper arm will not throw water far away when rotating, thus avoiding shielding the driver's sight.

A third aspect of the present application provides an automobile including two wipers as described in the above embodiment.

As the automobile has the wiper of the above-described embodiment, the automobile has the above-described beneficial effects that the wiper can achieve, and will not be repeatedly described here.

BRIEF DESCRIPTION OF THE DRAWINGS

In order to explain technical solutions in the present application or in the prior art more clearly, a brief description will be given to drawings which are used in a description of embodiments or the prior art, and it is obvious that the drawings in the description below are drawings in some embodiments of the present application. For those skilled in the art, other drawings can be obtained based on these drawings without inventive labor.

DETAILED DESCRIPTION

In order to make objects, technical solutions and advantages of the present application more apparent, the technical solutions of the present application will be clearly and completely described below with reference to drawings, and it is obvious that embodiments to be described are some, but not all embodiments of the present application. Based on the embodiments of the present application, all other embodiments obtained by ordinary skilled persons in the art without creative labor are within a scope of protection of the present application.

Figure 8:
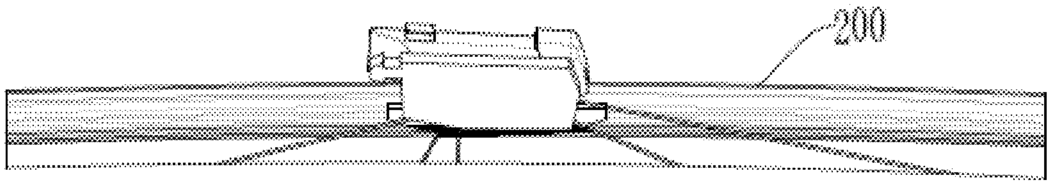
FIG. 8 is a schematic view of a point-spraying of a wiper in the prior art.
Figure 9:
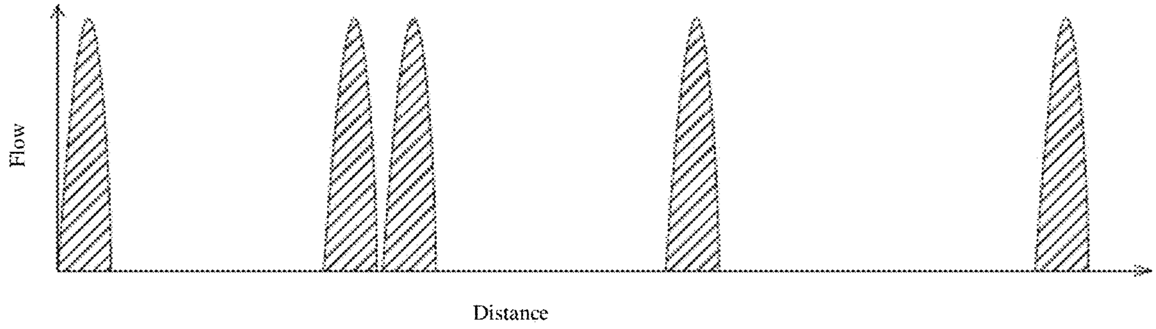
FIG. 9 is a flow distribution view of the point-spraying of the wiper in FIG. 8.

Referring to FIGS. 8 and 9, the wiper arm nozzle in the prior art adopts a point-spraying structure, and the water sprayed from the wiper arm nozzle presents a columnar form, and there is a large gap among water columns, which will cause the wiper arm to dry scrape during a swing process and damage to the glass.

Figure 1:
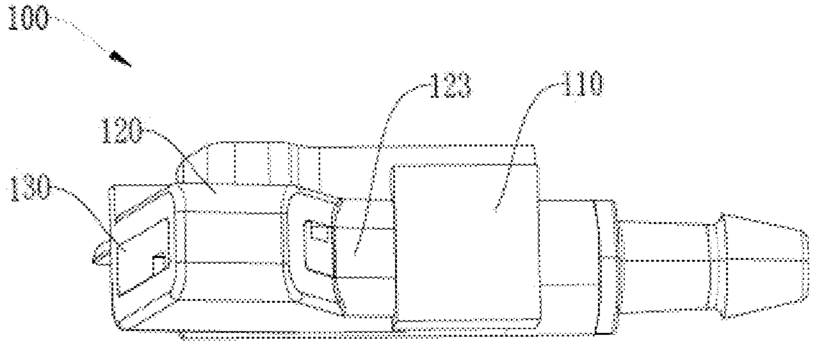
FIG. 1 is a schematic view of a structure of a wiper arm nozzle provided in an embodiment of a first aspect of the present application.

As shown in FIG. 1, an embodiment of the present application provides a wiper arm nozzle 100 which includes a nozzle body 110, a mounting portion 120, and a deflector 130. The wiper arm nozzle 100 is composed of three components, with a simple process and few parts, which can reduce manufacturing and labor costs.

Referring to FIGS. 1 to 4, the nozzle body 110 is provided with a water inlet 111, the mounting portion 120 is provided on the nozzle body 110, an interior of the mounting portion 120 being hollow forms a mounting cavity, and a bottom of the mounting cavity communicates with the water inlet 111. A first opening 121 and a second opening 122 are respectively formed at two ends of the mounting portion 120; and the deflector 130 is inserted into the mounting cavity and is partially located at the first opening 121 and the second opening 122. A first runner 131 and a second runner 132 are defined on the deflector 130, the first runner 131 forms a first water outlet at the first opening 121, and the second runner 132 forms a second water outlet at the second opening 122; wherein the first runner 131 and the second runner 132 are connected with a self-excited runner 140, and the first runner 131 gradually widens in a direction adjacent to the first water outlet, and the second runner 132 gradually widens in a direction adjacent to the second water outlet.

When the wiper arm nozzle 100 needs to spray water to the glass, water having a certain pressure enters the interior of the mounting cavity from the water inlet 111, and is sprayed out from the first water outlet and the second water outlet through the first runner 131 and the second runner 132 respectively under an action of the deflector 130. Since the first opening 121 and the second opening 122 are at either end of the mounting portion 120, correspondingly, directions of a water flow sprayed respectively from the first water outlet and the second water outlet are opposite. Since the first runner 131 is connected with the self-excited runner 140 in the direction adjacent to the first water outlet, and the second runner 132 is connected with the self-excited runner 140 in the direction adjacent to the second water outlet, the water sprayed from the first water outlet and the second water outlet will diffuse in a fan shape that swings left and right toward either end, so that particles of the water are uniformly distributed in an S-shape in a fan section area. Therefore, an area of water sprayed on the glass is large, and a blank area is small, thus preventing the wiper from dry scraping and damaging the glass.

Figure 12:
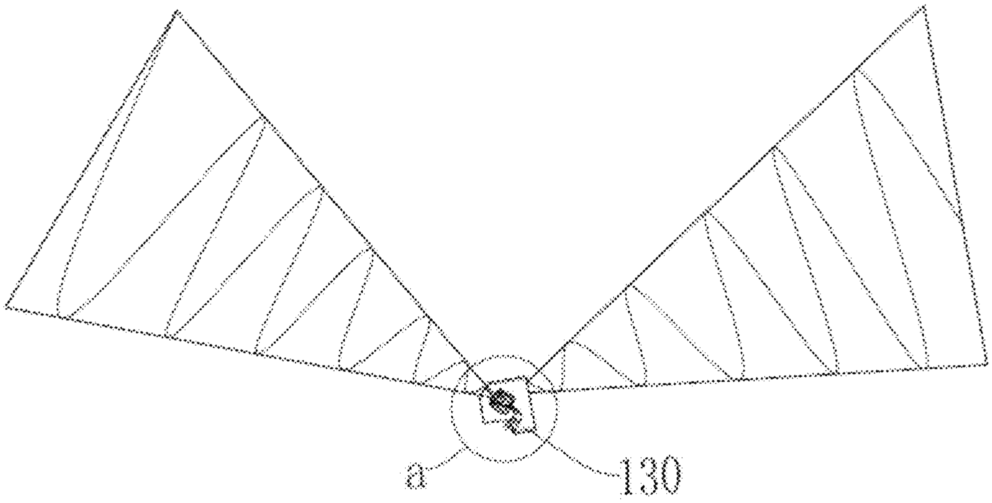
FIG. 12 is a self-excited schematic view of a self-excited runner of a deflector provided in the present application.
Figure 13:
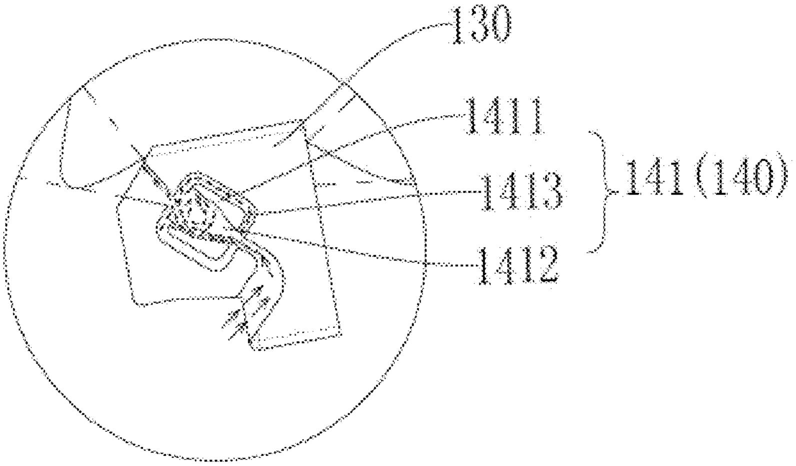
FIG. 13 is an enlarged partial schematic view of portion a in FIG. 12.

Referring to FIGS. 12 and 13, in one embodiment, the self-excited runner 140 includes a shunt portion 141 provided on the deflector 130, two shunt blocks 1411 facing each other are provided inside the shunt portion 141, a first deflecting portion 1413 is formed between the two shunt blocks 1411 and an inner wall of the shunt portion 141, and a second deflecting portion 1412 is formed between the two shunt blocks 1411, wherein the second deflecting portion 1412 gradually widens in the direction adjacent to the first water outlet. Two of the first deflecting portions 1413 are located on either side of the second deflecting portion 1412, and water flowing from two of the first deflecting portions 1413 and water flowing from the second deflecting portion 1412 merge into the first water outlet or the second water outlet, and present a cross-swaying state under an action of the inner wall of the first water outlet or the second water outlet.

In some specific embodiments, an included angle between fan-shaped water flows sprayed from the first water outlet and the second water outlet may reach 140°-180°. As such, the coverage area of the water flow becomes larger.

When the deflector 130 is inserted into the mounting cavity, portions of the deflector 130 on either side of the first runner 131 and the second runner 132 are fitted to an inner wall of the mounting portion 120 to form a first water outlet channel and a second water outlet channel. It should be understood that the first runner 131 and the second runner 132 are groove structures on a surface of the deflector 130. When the deflector 130 is adjacent to the inner wall of the mounting portion 120, the water flow will flow through a guidance of the first water outlet channel and the second water outlet channel, so that the water can be uniformly sprayed at the first water outlet and the second water outlet, wherein a flow direction of the first runner 131 is opposite to that of the second runner 132. As such, spaying is performed from two directions, and the coverage area is larger.

Figure 4:
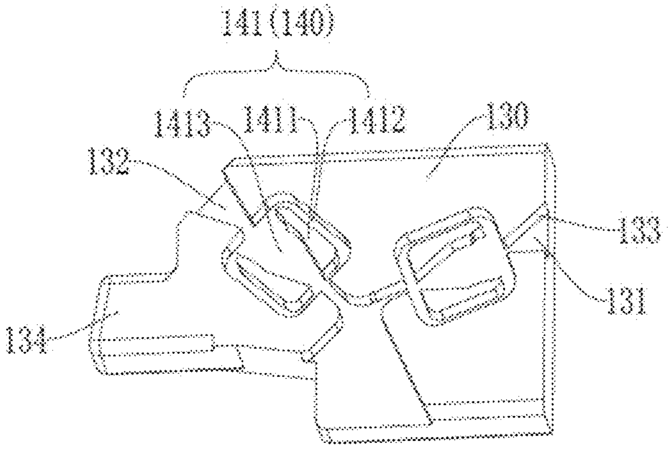
FIG. 4 is a schematic view of a structure of a first deflector provided in an embodiment of the present application.

As shown in FIG. 4, in one embodiment, the first runner 131 and the second runner 132 are on the same side of the deflector 130. The first runner 131 and the second runner 132 jointly use the same water inlet channel, and the water flow enters the water inlet channel, then is dispersed at an intersection of the first runner 131 and the second runner 132 and enters the first runner 131 and the second runner 132, respectively, and then is sprayed from the first water outlet and the second water outlet.

Figure 5:
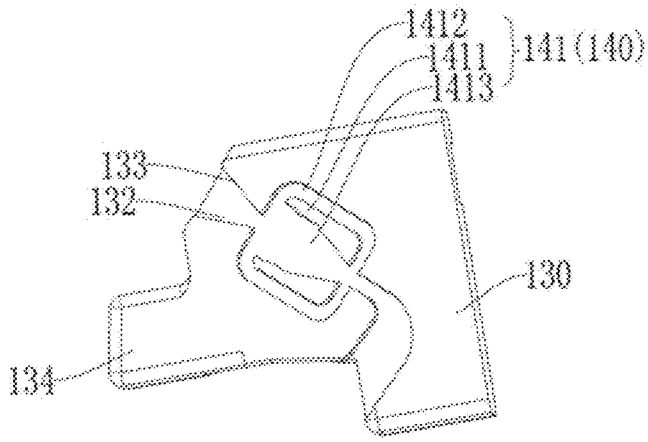
FIG. 5 is a schematic view of a back structure of a second deflector provided in an embodiment of the present application.
Figure 6:
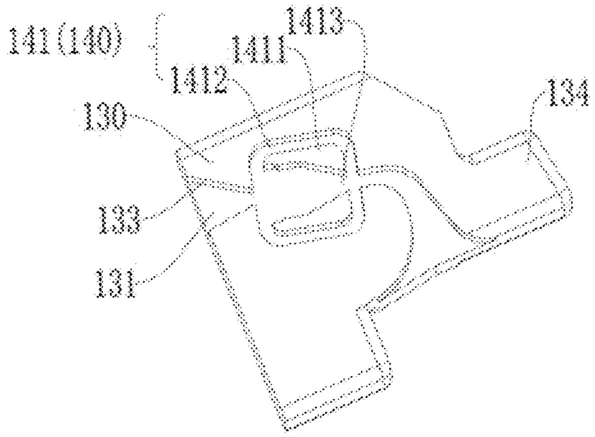
FIG. 6 is a schematic view of a front structure of the second deflector provided in an embodiment of the present application.

As shown in FIGS. 5 and 6, in another embodiment, the first runner 131 and the second runner 132 are on either side of the deflector 130. The first runner 131 and the second runner 132 respectively adopt two independent water inlet ends, and the water flow enters the first runner 131 and the second runner 132 from two of the water inlet ends, respectively, and then is sprayed out from the first water outlet and the second water outlet. Compared with the first runner 131 and the second runner 132 defined on the same side of the deflector 130, and the first runner 131 and the second runner 132 defined on either side of the deflector 130 here reasonably utilizes a space of the deflector 130, so that a structure of the deflector 130 is smaller.

In the present application, both the first runner 131 and the second runner 132 include two runner walls 133 facing each other, wherein the two runner walls 133 gradually move closer to the interior of the mounting cavity from the first water outlet or the second water outlet. The two runner walls 133 intersect with each other. In some specific shapes, the first runner 131 and the second runner 132 are in a trapezoidal state at the first opening 121 and the second opening 122. It should be noted that, after the deflector 130 and the mounting portion 120 are mounted and sealed, under the action of the self-excited runner 140, the water flow sprayed out from the first water outlet and the second water outlet can form a flat fan shape, and the water flow swings left and right, and the particles of the water are evenly distributed in the S-shape in the fan section area, so that the sprayed water flow is more uniform.

Figure 2:
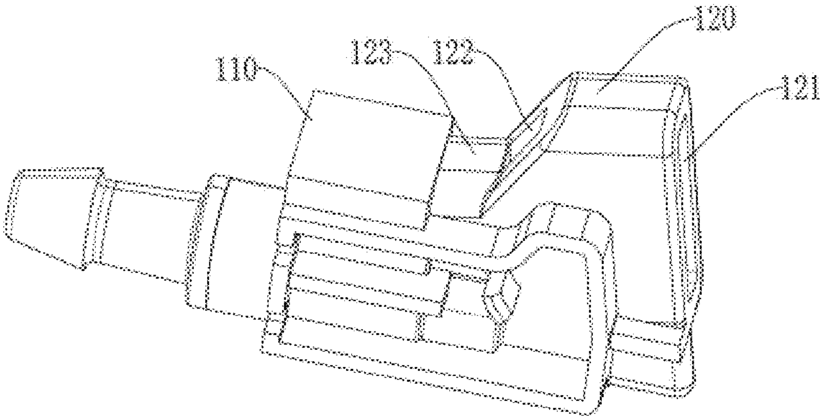
FIG. 2 is a schematic view of a structure of a nozzle body provided in an embodiment of the present application.
Figure 3:
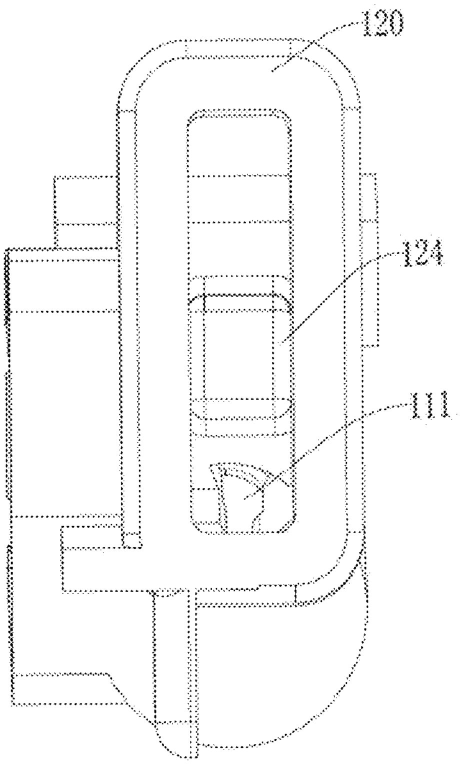
FIG. 3 is a side view of a nozzle body provided in an embodiment of the present application.

Referring to FIGS. 1 to 3, in one embodiment, a limiting block 123 is provided on the mounting portion 120, and the limiting block 123 is located below the second opening 122. When the deflector 130 is inserted into the mounting cavity, the limiting block 123 abuts against the deflector 130. In order to prevent the deflector 130 from being easily loosened due to an action of water flow pressure when inserted into the mounting cavity and affecting a spaying effect, the deflector 130 and the mounting portion 120 are interference-fitted. The mounting portion 120 and the limiting block 123 jointly limit the deflector 130 to stabilize the mounting of the deflector 130.

Further, the first opening 121 is larger than the second opening 122, and the first opening 121 forms an insertion end of the mounting portion 120. The deflector 130 is inserted into the mounting portion 120 from the first opening 121, stops moving when abutting against the limiting block 123, and at this time, the deflector 130 abuts against the limiting block 123, both side inner walls and a top inner wall of the mounting portion 120. As such, the deflector 130 is inserted from the first opening 121, so that the mounting of the wiper arm nozzle 100 is more convenient.

Furthermore, the limiting block 123 is concave to form a snap-fit portion 124, the snap-fit portion 124 is a groove, and the deflector 130 is provided with an extension section 134, and the extension section 134 can be inserted into the snap-fit portion 124. A interference fit between the extension section 134 and a notch of the groove, that is, when the extension section 134 is inserted into the groove, the extension section 134 is fitted to an inner wall of the groove, so that when the deflector 130 is pressed into place in the mounting portion 120, the water flow can be prevented from flowing out of a gap between the groove and the deflector 130, avoiding affecting the spraying effect of the nozzle.

As shown in FIG. 1, in one embodiment, the mounting portion 120 is a part of the nozzle body 110, and the mounting portion 120 and the nozzle body 110 are both plastic parts, and are integrally formed by injection molding of the plastic parts, which facilitates manufacturing of the nozzle body 110. At the same time, a connection between the mounting portion 120 and the nozzle body 110 is smooth, avoiding a large gap between the mounting portion 120 and the deflector 130 when the deflector is inserted, so that the deflector 130 has good sealing when the deflector 130 is inserted, and a spaying efficiency is ensured.

The wiper arm nozzle 100 of the present application is composed of a nozzle body 110, a deflector 130, and a mounting portion 120, and has few parts, a simple structure, and is easy to mount; the mounting portion 120 is integrally connected to the nozzle body 110, and the deflector 130 is interference-fitted with the mounting portion 120, making the structure of the nozzle compact and reducing manufacturing and labor costs.

Figure 7:
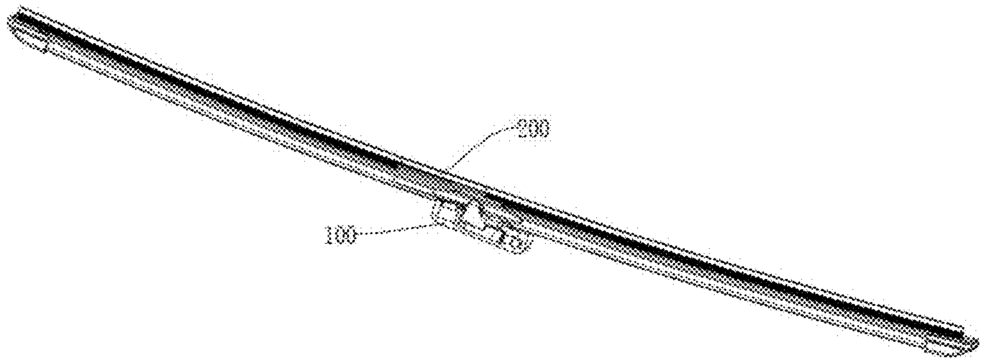
FIG. 7 is a schematic view of a structure of a wiper provided in an embodiment of a second aspect of the present application.
Figure 10:
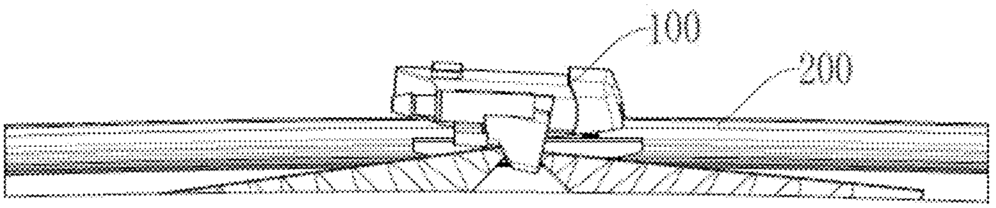
FIG. 10 is a schematic view of a spray of a wiper provided in the present application.
Figure 11:
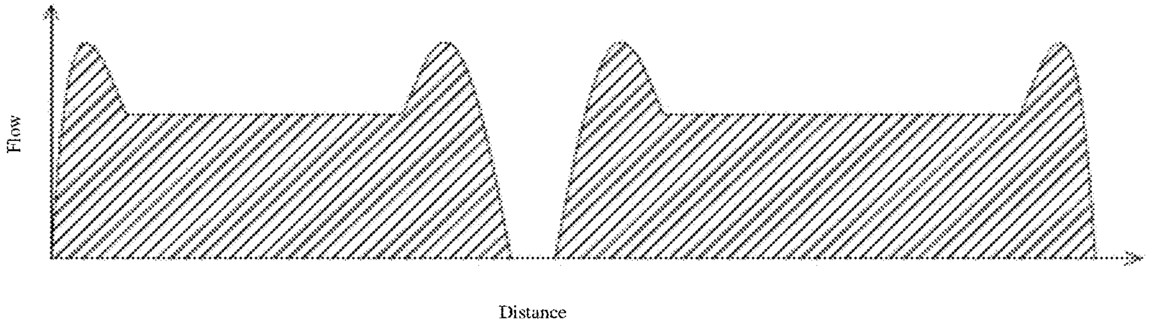
FIG. 11 is a flow distribution view of the spray of a wiper provided in the present application.

Referring to FIGS. 7, 10, and 11, a second aspect of the present application provides a wiper 200 including a wiper arm 210 and the wiper arm nozzle 100 according to any one of the above embodiments, the wiper arm nozzle 100 is provided on the wiper arm 210, and the first water outlet and the second water outlet respectively face two opposite directions of the wiper arm 210. Since the water sprayed from the first water outlet and the second water outlet is in a swaying fan shape state, and the wiper arm nozzle 100 of the wiper 200 sprays from two directions, the coverage area is large and the spraying is uniform, which facilitates wiping by the wiper arm 210. Due to a large coverage area and uniform spraying of the wiper arm nozzle 100, the wiper arm 210 will not throw water far away when rotating, thus avoiding shielding the driver's sight.

A third aspect of the present application provides an automobile including two wipers 200 as described in the above embodiment. The two wipers 200 are rotatably arranged on the automobile, and are used for spraying water to wipe the glass of the automobile.

As the automobile has the wiper 200 of the above-described embodiment, the automobile has the above-described beneficial effects that the wiper 200 can achieve, and will not be repeatedly described here.

Finally, it should be noted that: the above embodiments are only used to illustrate the technical solutions of the present application, and not to limit the same; while the present application has been described in detail and with reference to the foregoing embodiments, it will be understood by a person skilled in the art that: the technical solutions described in the foregoing embodiments may still be modified, or some technical features may be equivalently replaced; and these modifications or substitutions do not depart from a spirit and scope of corresponding technical solutions of the embodiments of the present application.

LISTING OF REFERENCE SIGNS

100. wiper arm nozzle;
110. nozzle body;
111. water inlet;
120. mounting portion;
121. first opening;
122. second opening;
123. limiting block;
124. snap-fit portion;
130. deflector;
131. first runner;
132. second runner;
133. runner wall;
134. extension section;
140. self-excited runner;
141. shunt portion;
1411. shunt block;
1413. first deflecting portion;
1412. second deflecting portion;
200. wiper;
210. wiper arm.

What is claimed is:

1. A wiper arm nozzle, comprising:
a nozzle body provided with a water inlet;
a mounting portion provided on the nozzle body, wherein an interior of the mounting portion being hollow forms a mounting cavity, a bottom of the mounting cavity communicates with the water inlet, and two ends of the mounting portion are respectively defined with a first opening and a second opening; and
a deflector configured to be inserted into the mounting cavity and partially located at the first opening and the second opening, wherein a first runner and a second runner are defined on the deflector, the first runner forms a first water outlet at the first opening, and the second runner forms a second water outlet at the second opening;
wherein the first runner and the second runner are connected with a self-excited runner, the first runner gradually widens in a direction adjacent to the first water outlet, and the second runner gradually widens in a direction adjacent to the second water outlet.

2. The wiper arm nozzle according to claim 1, wherein the self-excited runner comprises a shunt portion provided on the deflector, two shunt blocks facing each other are provided inside the shunt portion, a first deflecting portion is formed between the two shunt blocks and an inner wall of the shunt portion, a second deflecting portion is formed between the two shunt blocks, and the second deflecting portion gradually widens in the direction adjacent to the first water outlet or the direction adjacent to the second water outlet.

3. The wiper arm nozzle according to claim 1, wherein
when the deflector is inserted into the mounting cavity, portions of the deflector on either side of the first runner and the second runner are fitted to an inner wall of the mounting portion to form a first water outlet channel and a second water outlet channel, and a flow direction of the first runner is opposite to that of the second runner.

4. The wiper arm nozzle according to claim 3, wherein
the first runner and the second runner are on a same side of the deflector; or
the first runner and the second runner are on either side of the deflector.

5. The wiper arm nozzle according to claim 1, wherein
a limiting block is provided on the mounting portion and is located below the second opening, and when the deflector is inserted into the mounting cavity, the limiting block abuts against the deflector.

6. The wiper arm nozzle according to claim 5, wherein
the first opening is larger than the second opening, and the first opening forms an insertion end of the mounting portion.

7. The wiper arm nozzle according to claim 5, wherein
the limiting block is concave to form a snap-fit portion, an extension section is provided on the deflector, and the extension section is configured to be inserted into the snap-fit portion.

8. The wiper arm nozzle according to claim 1, wherein
the mounting portion is integrally connected to the nozzle body.

9. A wiper, comprising:
a wiper arm; and
the wiper arm nozzle according to claim 1, wherein the wiper arm nozzle is provided on the wiper arm, and the first water outlet and the second water outlet respectively face two opposite directions of the wiper arm.

10. An automobile, comprising two wipers according to claim 9.

* * * * *